(12) United States Patent
Cortes

(10) Patent No.: US 10,589,964 B2
(45) Date of Patent: Mar. 17, 2020

(54) ELEVATOR CAR, ELEVATOR SYSTEM AND METHOD OF CHECKING, MAINTAINING AND/OR REPAIRING AN ELEVATOR SYSTEM

(71) Applicant: Otis Elevator Company, Farmington, CT (US)

(72) Inventor: Juan Cortes, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 239 days.

(21) Appl. No.: 15/784,776

(22) Filed: Oct. 16, 2017

(65) Prior Publication Data

US 2018/0105395 A1    Apr. 19, 2018

(30) Foreign Application Priority Data

Oct. 17, 2016  (EP) .................................... 16194077

(51) Int. Cl.
*B66B 11/02* (2006.01)
*B66B 1/46* (2006.01)
(Continued)

(52) U.S. Cl.
CPC .......... *B66B 11/0246* (2013.01); *B66B 1/461* (2013.01); *B66B 5/0087* (2013.01);
(Continued)

(58) Field of Classification Search
CPC ....... B66B 1/3469; B66B 1/461; B66B 1/466; B66B 1/467; B66B 5/0087; B66B 11/0025; B66B 11/0226; B66B 11/0246; B66B 11/0253; H02B 1/015; H02B 1/30; H02B 1/308; H02B 1/32; H02B 1/36
See application file for complete search history.

(56) References Cited

U.S. PATENT DOCUMENTS 3,328,927 A * 7/1967 Kates .................. B66B 11/0253
52/65
3,490,603 A * 1/1970 Willer .................. H05K 7/1417
211/41.17
(Continued)

FOREIGN PATENT DOCUMENTS

EP      1056679 B1    6/2003
EP      1026116 B1    5/2004
(Continued)

OTHER PUBLICATIONS

European Search Report for application EP 16194077.0, dated Apr. 11, 2017, 7 pages.
(Continued)

*Primary Examiner* — Minh Truong
(74) *Attorney, Agent, or Firm* — Cantor Colburn LLP

(57) ABSTRACT

An elevator car (6) comprises at least one movable wall panel (16, 18), which is movable between a closed position, in which the at least one movable wall panel (16, 18) constitutes a portion of a sidewall of the elevator car (6), and at least one open position providing an opening (24) which allows access to areas outside the elevator from inside the elevator car (6). The at least one movable wall panel (16, 18) includes a first movable wall panel (16) constituting or supporting a car operation panel (7*b*).

11 Claims, 6 Drawing Sheets

(51) Int. Cl.
*B66B 5/00* (2006.01)
*H02B 1/36* (2006.01)

(52) U.S. Cl.
CPC ...... *B66B 11/0226* (2013.01); *B66B 11/0253* (2013.01); *H02B 1/36* (2013.01)

(56) References Cited

U.S. PATENT DOCUMENTS

| | | | |
|---|---|---|---|
| 5,862,889 A * | 1/1999 | Sevilleja | B66B 1/466 |
| | | | 187/395 |
| 6,739,432 B2 | 5/2004 | Elsener | |
| 8,316,998 B2 * | 11/2012 | Henseler | B66B 11/0246 |
| | | | 187/317 |
| 8,573,367 B2 | 11/2013 | Henseler | |
| 8,967,336 B2 | 3/2015 | Henseler | |
| D732,695 S * | 6/2015 | Saikawa | D10/108 |
| 9,573,791 B2 * | 2/2017 | Garcia | B66B 11/0005 |
| 10,392,227 B2 * | 8/2019 | Convard | B66B 9/00 |
| 2014/0076670 A1 | 3/2014 | Henseler | |
| 2015/0246792 A1 * | 9/2015 | Baltis | B66B 11/0246 |
| | | | 187/276 |
| 2017/0297870 A1 * | 10/2017 | Fauconnet | B66B 11/0226 |

FOREIGN PATENT DOCUMENTS

| | | |
|---|---|---|
| EP | 1533265 A1 | 5/2005 |
| EP | 1050504 B1 | 6/2006 |
| EP | 1760029 A1 | 3/2007 |
| EP | 1170241 B2 | 12/2009 |
| EP | 2114810 B1 | 1/2011 |
| EP | 2333209 A1 | 6/2011 |
| EP | 1433734 B1 | 10/2011 |
| EP | 2877419 B1 | 7/2016 |
| JP | 2004149261 A | 5/2004 |
| JP | 2005247454 A | 9/2005 |
| JP | 2007284228 A | 11/2007 |
| JP | 2009096618 A | 5/2009 |
| JP | 2015051815 A | 3/2015 |
| WO | 2016012828 A1 | 1/2016 |

OTHER PUBLICATIONS

Chinese First Office Action for application CN 201710967940.1, dated Dec. 3, 2018, 8 pages.

* cited by examiner

ELEVATOR CAR, ELEVATOR SYSTEM AND METHOD OF CHECKING, MAINTAINING AND/OR REPAIRING AN ELEVATOR SYSTEM

The invention relates to an elevator car, in particular to an elevator car with a maintenance opening, to an elevator system comprising such an elevator car, and to a method of checking, maintaining and/or repairing such an elevator system.

Every elevator system usually comprises components located outside the elevator car, in particular within a hoistway of the elevator system, which need to be accessed from time to time for being checked, maintained and/or repaired. For accessing these components, usually a mechanic needs to enter the hoistway above or below the elevator car. Entering the hoistway, however, is difficult.

It therefore would be beneficial to facilitate the maintenance of the elevator system and to enhance the safety of any mechanic performing the maintenance by providing an improved elevator car, an elevator system comprising such an improved elevator car, and a method of maintaining such an elevator system.

According to an exemplary embodiment of the invention, an elevator car comprises at least one movable wall panel including a first movable wall panel constituting or supporting a car operation panel. The at least one movable wall panel is movable between a closed position, in which the at least one movable wall panel constitutes a portion of a sidewall of the elevator car, and at least one open position providing an opening which allows access to areas outside the elevator car from inside the elevator car.

An elevator system according to an exemplary embodiment of the invention comprises at least one elevator car with at least one movable wall panel including a first movable wall panel constituting or supporting a car operation panel. The at least one movable wall panel is movable between a closed position, in which the at least one movable wall panel forms a portion of a sidewall of the elevator car, and at least one open position providing an opening which allows access to areas outside the elevator car from inside the elevator car.

According to an exemplary embodiment of the invention a method of checking, maintaining and/or repairing an elevator system includes the step of moving the at least one movable wall panel from its closed position into an open position for allowing access to components located outside the elevator car from inside the elevator car.

The opening in particular provides access from inside the elevator car to areas located outside the elevator car, which need to be regularly checked, maintained and/or repaired.

An elevator car according to an exemplary embodiment of the invention provides easy access to components of the elevator system, which are located outside the elevator car, from inside the elevator car. In an elevator system comprising such an elevator car such components may be accessed easily from inside the elevator car without leaving the elevator car and entering the hoistway. As a result, checking, maintaining and repairing the elevator system is facilitated and the risk of accidents, which may occur when a mechanic enters the hoistway outside the elevator car, is reduced.

An elevator car according to an exemplary embodiment of the invention further provides easy access to the rear side of the car operation panel. This facilitates checking, maintaining and/or repairing said car operation panel.

The skilled person will understand that the invention may be employed easily in elevator systems comprising two or more elevator cars. Thus, if the text refers to "an" elevator car, this is not to be understood as restricting the scope of the present invention to an elevator system comprising only a single elevator car.

Exemplary embodiments of the invention are described in the following with reference to the enclosed figures:

FIG. 1 schematically depicts an elevator system according to an exemplary embodiment of the invention.

FIG. 2 in particular shows a perspective view of an elevator car according to a first exemplary embodiment of the invention.

Figure 5:
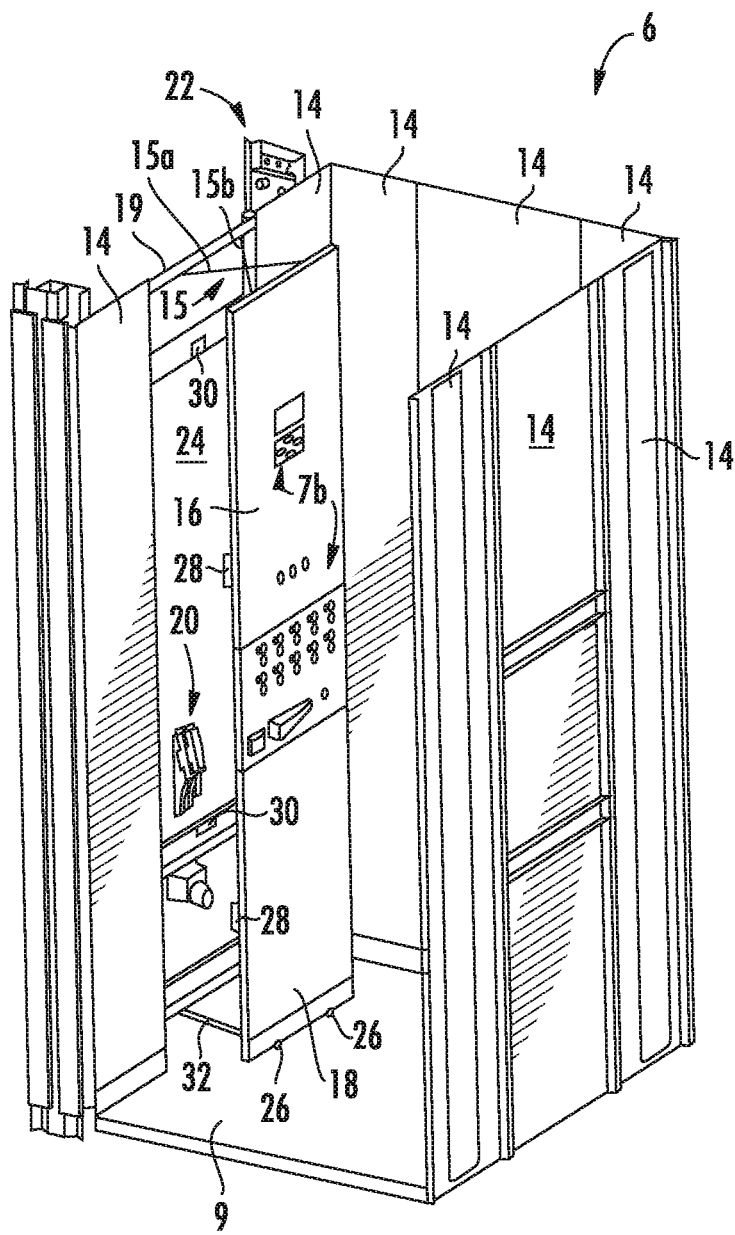

FIG. 5 in particular shows a perspective view of an elevator car according to a second exemplary embodiment of the invention.

Figure 6:
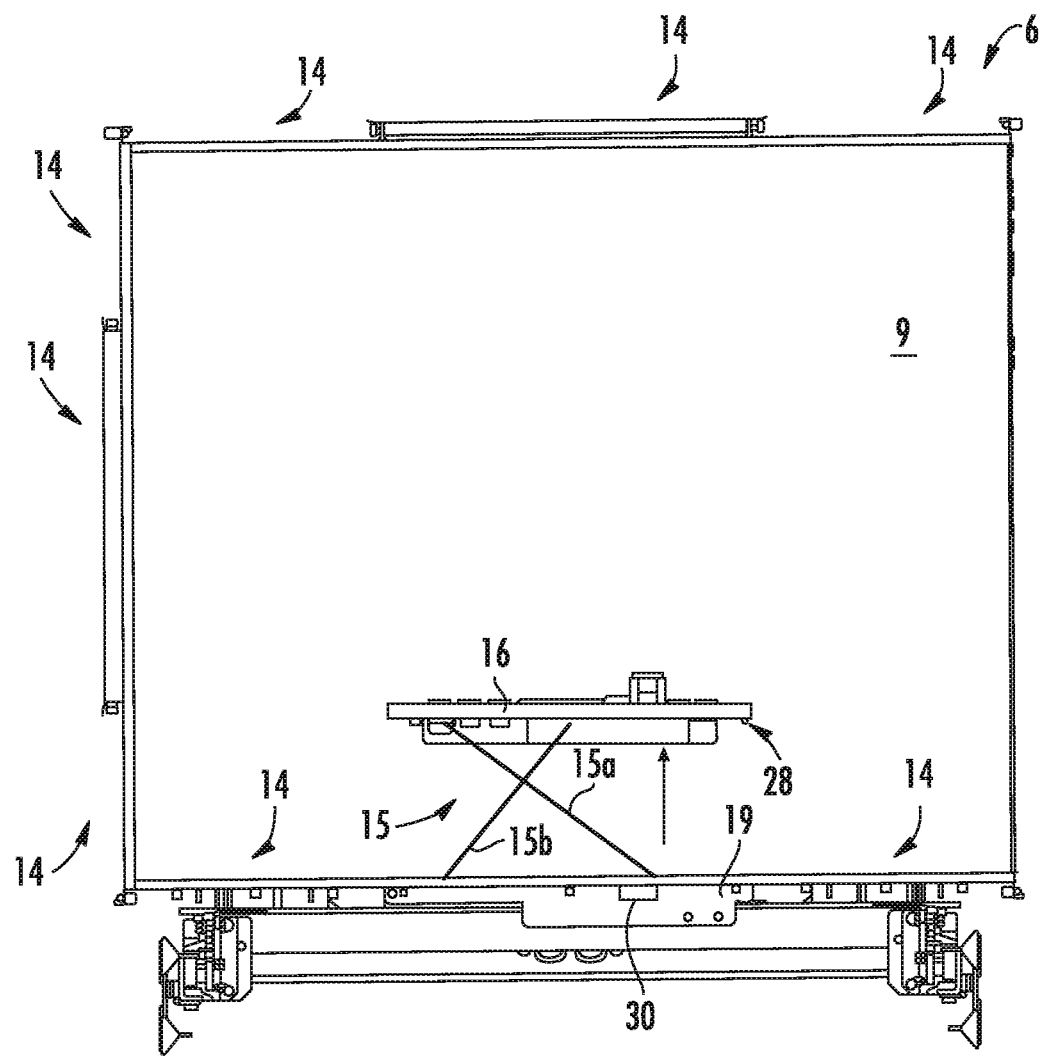

FIG. 6 shows a top view of the elevator car shown in FIG. 5.

Figure 1:
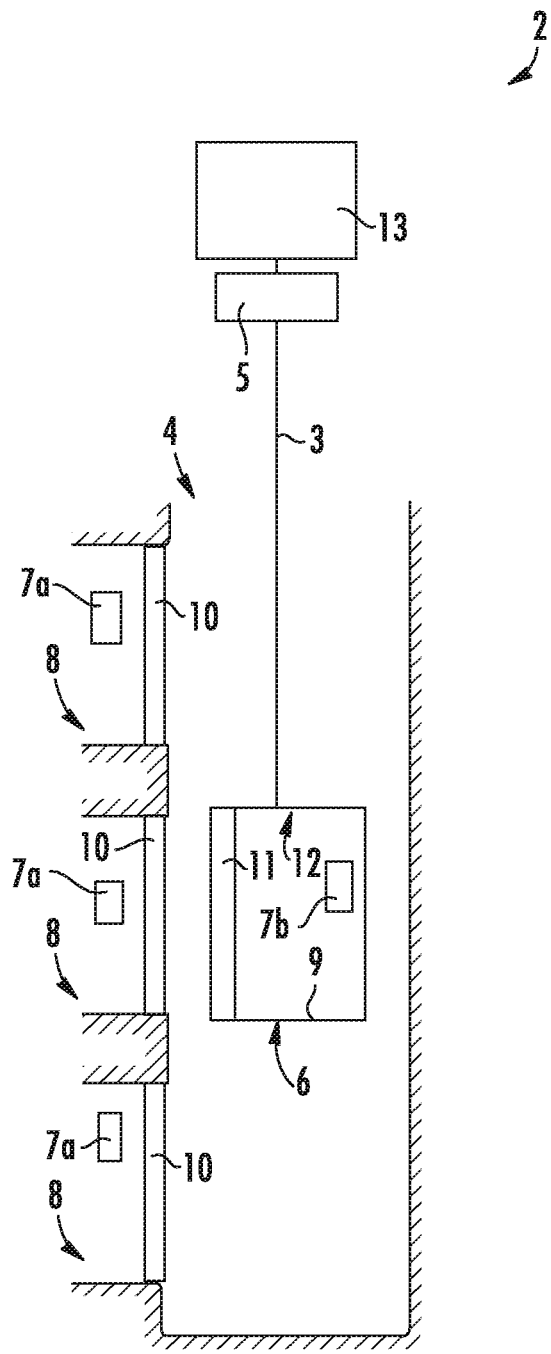

FIG. 1 schematically depicts an elevator system 2 according to an exemplary embodiment of the invention.

The elevator system 2 includes an elevator car 6 which is movably arranged within a hoistway 4 extending between a plurality of landings 8 located on different floors.

The elevator car 6 is movably suspended by means of a tension member 3. The tension member 3, for example a rope or belt, is connected to an elevator drive 5, which is configured for driving the tension member 3 in order to move the elevator car 6 along the height of the hoistway 4 between the plurality of landings 8.

Each landing 8 is provided with a landing door 10, and the elevator car 6 is provided with a corresponding elevator car door 11 for allowing passengers to transfer between a landing 8 and the interior of the elevator car 6 when the elevator car 6 is positioned at the respective landing 8.

The exemplary embodiment shown in FIG. 1 uses a 1:1 roping for suspending the elevator car 6. The skilled person, however, easily understands that the type of the roping is not essential for the invention and that different kinds of roping, e.g. a 2:1 roping, may be used as well. The elevator system 2 may use a counterweight (not shown) or not. The elevator drive 5 may be any form of drive used in the art, e.g. a traction drive, a hydraulic drive or a linear drive. The elevator system 2 may have a machine room or may be a machine room-less elevator system. The elevator system 2 may use a tension member 3, as it is shown in FIG. 1, or it may be an elevator system without a tension member 3.

The elevator drive 5 is controlled by an elevator control unit 13 for moving the elevator car 6 along the hoistway 4 between the different landings 8.

Input to the control unit 13 may be provided via landing control panels 7a, which are provided on each landing 8 close to the landing doors 10, and/or via a car operation panel 7b provided inside the elevator car 6.

The landing control panels 7a and the car operation panel 7b may be connected to the elevator control unit 13 by means of electrical lines, which are not shown in FIG. 1, in particular by an electric bus, or by means of wireless data connections.

Figure 2:
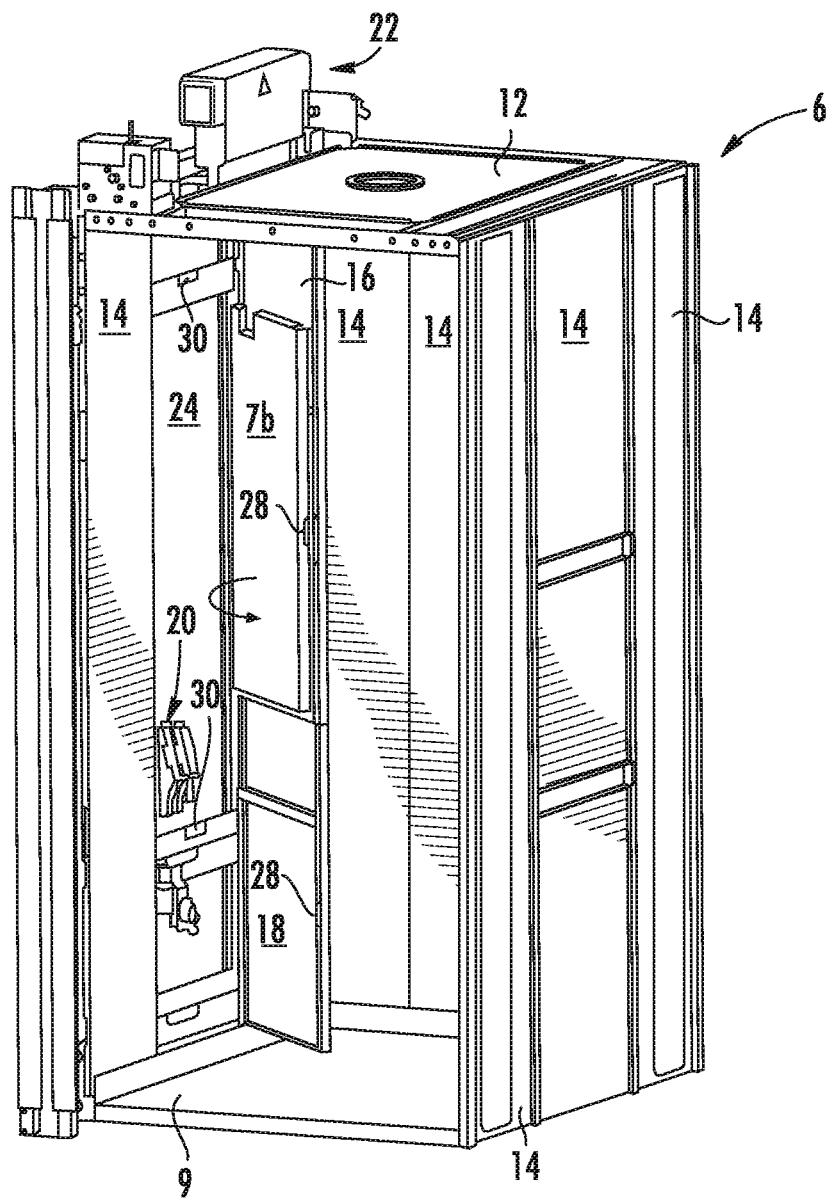
Figure 3:
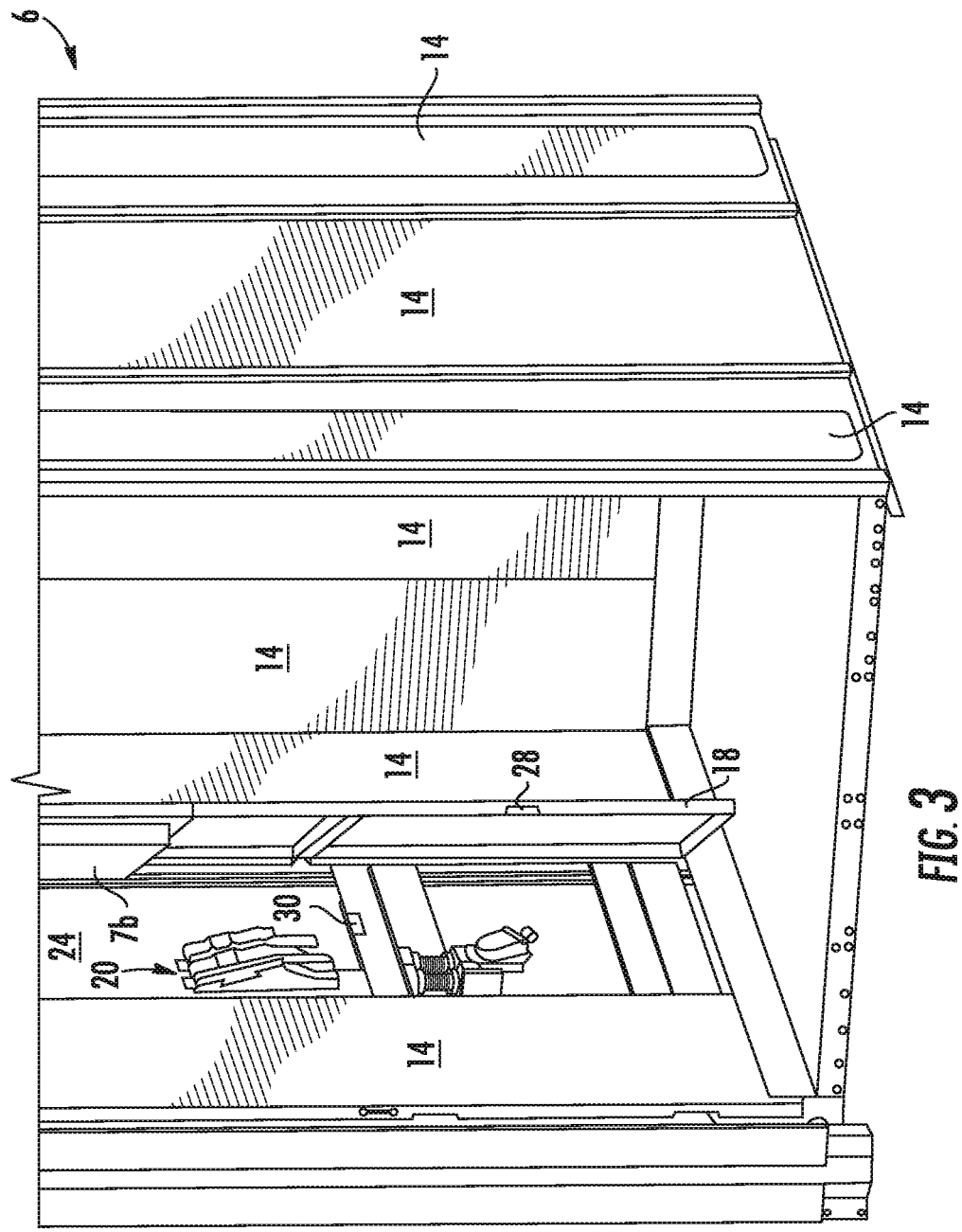
FIG. 3 shows an enlarged lower portion of the elevator car shown in FIG. 2.
Figure 4:
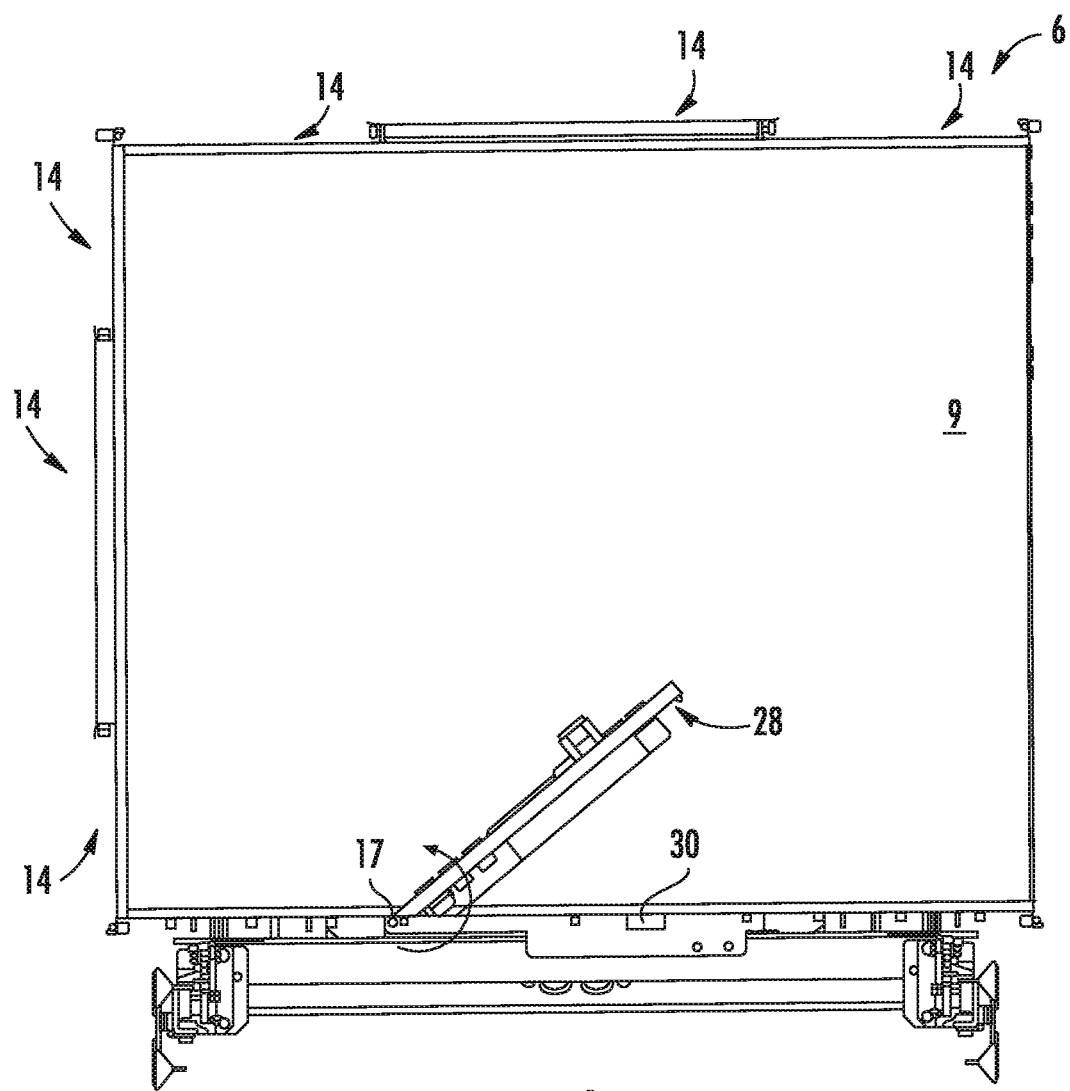
FIG. 4 shows a top view of the elevator car shown in FIGS. 2 and 3.

FIGS. 2 to 4 depict an elevator car 6 according to first exemplary embodiment of the invention.

FIG. 2 in particular shows a perspective view of the elevator car 6, FIG. 3 shows an enlarged lower portion of said elevator car 6, and FIG. 4 shows a top view of the same.

The elevator car 6 comprises a floor 9 and a ceiling 12 which are connected to each other by a plurality of vertically extending structural wall panels 14.

In order to allow for an unobstructed view into the interior space of the elevator car 6, the front portion of the elevator car 6 comprising the elevator car door 11 (see FIG. 1) is omitted in FIGS. 2 and 3. For the same reason, the ceiling 12 of the elevator car 6 is not shown in FIG. 4.

The elevator car 6 further comprises a first movable wall panel 16 supporting the car operation panel 7b. In an alternative solution, the car operation panel 7b may be formed integrally with the first movable wall panel 16 so that the first movable wall panel 16 constitutes the car operation panel 7b.

Said first movable wall panel 16 is pivotably mounted to the elevator car 6. As a result, the first movable wall panel 16 may be pivoted between a closed position, in which it is arranged parallel to and in line with the adjacent structural wall panels 14, and an open position as it is depicted in FIGS. 2 to 4. When positioned in an open position, the first movable wall panel 16 is pivoted inside the interior space of the elevator car 6 providing an opening 24 within a side wall of the elevator car 6 and providing access to the rear side of the car operation panel 7b, which is supported by or integrally formed with the first movable wall panel 16.

A second movable wall panel 18, which is arranged below the first movable wall panel 16, is pivotably connected to an adjacent structural wall panel 14 as well, so that it may be moved similar and parallel to the first movable wall panel 16.

The first and the second movable wall panels 16, 18 in particular may be connected to each other, e.g. by screws or bolts, so that the first and the second movable wall panels 16, 18 are movable (only) together as an integral unit.

The opening 24, which is provided within the side wall of the elevator car 6 when the first and the second movable wall panels 16, 18 are moved into an open position, provides easy access to areas 20, 22 outside the elevator car 6. These areas 20, 22 in particular may include an area 20 in which the tension member 3 (not shown in FIGS. 2 to 4) is connected to the elevator car 6, e.g. by means of a fixture or a pulley/deflector roller.

The accessible areas 20, 22 may further include an area 22 in which at least one of safety, governor, speed sensor and a position sensor is provided at the outside, in particular at the rear side or and/on top of the elevator car 6.

Thus, the opening 24 allows a mechanic to access these areas 20, 22 from inside the elevator car 6 without entering into the hoistway 4 of the elevator system 2. This allows to check, maintain and/or repair the components located in these areas 20, 22 conveniently. It further reduces the risk of accidents compared to a situation in which the mechanic needs to enter the hoistway 4 above or below the elevator car 6 for accessing the components.

Providing access to a rear side of the car operation panel 7b by moving the first movable wall panel 16 into an open position also facilitates checking, maintaining and/or repairing said car operation panel 7b.

Each of the first and second movable wall panels 16, 18 is provided with a locking mechanism 28. The locking mechanisms 28 are configured for locking the first and the second movable wall panels 16, 18 in their respective closed positions for preventing an unauthorized opening of the first and the second movable wall panels 16, 18.

The elevator car 6 further comprises two safety switches 30 which are configured for preventing any movement of the elevator car 6 when at least one of the first and second movable wall panels 16, 18 is not positioned in its closed position. This enhances the safety of the elevator system 2 and in particular the safety of a mechanic working inside the elevator car 6.

In case the first and second movable wall panels 16, 18 are connected to each other forming an integral unit, providing only a single locking mechanism 28 and/or only one safety switch 30 at one of the first and second movable wall panels 16, 18 may be sufficient.

FIGS. 5 and 6 illustrate an exemplary embodiment of an elevator car according to a second exemplary embodiment of the invention. FIG. 5 in particular shows a perspective view of the elevator car 6, and FIG. 6 shows a top view of the same.

For allowing an unobstructed view into the interior of the elevator car 6, similar to FIGS. 2 to 4 depicting the first embodiment, the front side of the elevator car 6 (see FIG. 1) comprising the elevator car door 11 is not shown in FIG. 5 and the ceiling 12 of the elevator car 6 is not shown in FIG. 6.

In said second embodiment, the first movable wall panel 16 supporting or constituting the car operation panel 7b as well as the second movable wall panel 18, which is arranged below the first movable wall panel 16, are movable between a closed position, in which the first and the second movable wall panels 16, 18 are in line with the adjacent structural wall panels 14, and an open position providing an opening 24 which allows access to areas outside the elevator car 6 from inside the elevator car 6.

In contrast to the first embodiment the first and the second movable wall panels 16, 18 are not pivotable around a vertically extending axis 17. Instead, the first and the second movable wall panels 16, 18 are linearly movable (slideable) in a direction which is oriented basically orthogonally to the plane of the first and the second movable wall panels 16, 18 and the adjacent structural wall panels 14.

Said motion may be realized by means of scissor mechanism 15 comprising two scissor bars 15a, 15b connecting at least one of the first and second movable wall panels 16, 18 with a structural bar 19 extending horizontally between two adjacent structural wall panel 14 and bridging the opening 24 provided between the structural wall panels 14.

Only one scissor mechanism 15 provided at the top of the first movable wall panel 16 is shown in FIGS. 5 and 6. The skilled person, however, will understand that additional scissor mechanisms 15 may be provided at different heights of the first and second movable wall panels 16, 18 in order to increase the stability of the structure.

Rollers 26 are provided at the lower edge of the second movable wall panel 18 for movably supporting the second movable wall panel 18 on the floor 9 of the elevator car 6.

Guide rails 32 may be provided within the floor 9 of the elevator car 6 for guiding the second movable wall panel 18 along a desired pathway from the closed position to an open position. Similar guide rails (not shown) may be provided in or at the ceiling 12 of the elevator car 6. The guide rails 32 may be configured for guiding the rollers 26 and/or for guiding pins (not shown) provided at top or at the bottom of the first and second movable wall panels 16, 18.

Although not shown in FIGS. 2 to 4, rollers 26 and guide rails 32 may be employed in an elevator car 6 according to the first embodiment as well.

Each of the first and second movable wall panels 16, 18 is provided with a locking mechanism 28. The locking mechanisms 28 are configured for locking the first and/or second movable wall panels 16, 18 in their respective closed positions for preventing an unauthorized opening of the first and second movable wall panels 16, 18.

The elevator car 6 further comprises two safety switches 30, which are configured for preventing any movement of the elevator car 6 when at least one of the first and second movable wall panels 16, 18 is not positioned in its closed position. This enhances the safety of the elevator system 2 and in particular the safety of a mechanic working inside the elevator car 6.

In case the first and second movable wall panels 16, 18 are connected to each other forming an integral unit, providing only a single locking mechanism 28 and/or only a single safety switch 30 at one of the first and second movable wall panels 16, 18 may be sufficient.

In a third embodiment, which is not shown in the Figures, the first and second movable wall panels 16, 18 may be configured to be moved in a direction, which is oriented orthogonally to the plane of the adjacent structural wall panels 14, only a few centimeters in a first step in order to be moved parallel to the plane of the adjacent structural wall panels 14, similar to a sliding door, in a second step for providing the opening 24 within the side wall of the elevator car 6.

An elevator car 6 according to a third embodiment may comprise rollers 26, guide rails 32, locking mechanisms 28 and safety switches 30, as it has been described with respect to the first and second embodiments, too.

Although in the embodiments shown in the figures the second movable wall panel 18 is arranged below the first movable wall panel 16, the skilled person will understand that in alternative configurations, which art not shown in the figures, the second movable wall panel 18 may be arranged above the first movable wall panel 16. Other embodiments may comprise two second movable wall panels 18, wherein one of the second movable wall panels 18 is arranged below the first movable wall panel 16 while another one of the second movable wall panels 18 is arranged above the first movable wall panel 16. In case the first wall panel is sufficiently large, particularly extends along a sufficiently large fraction of the height of the elevator car, it is conceivable to provide only the first wall panel without any second wall panel. In such embodiments, the first wall panel may even extend from the bottom to the ceiling of the elevator car.

A number of optional features are set out in the following. These features may be realized in particular embodiments, alone or in combination with any of the other features.

In an embodiment the elevator car has a ceiling and there is no opening or flap in the ceiling of the elevator car, as the at least one movable wall panel is sufficient for providing access to the components outside the elevator car. As a result, the ceiling may be formed with large stability at low costs. The full area of the ceiling may be used for illuminating the elevator car. Additionally, access to components located outside the elevator car is more convenient via at least one movable wall panel than access via an opening provided within the ceiling, as there is no need for providing a ladder or a similar device for reaching through the ceiling.

The first movable wall panel may have a considerable size thus allowing to reach all necessary components when the first wall panel is in its open position. In some embodiments, the first movable wall panel may extend along at least 25% of the height of the elevator car. Particularly, the first wall panel may even extend along at least 33% of the height of the elevator car. Particularly, the first wall panel may even extend along at least 50% of the height of the elevator car. Particularly, the first wall panel may even extend along at least 66% of the height of the elevator car. Particularly, the first wall panel may even extend along at least 75% of the height of the elevator car. Particularly, the first wall panel may even extend along at least 90% of the height of the elevator car. Particularly, the first wall panel may even extend along the height of the elevator car thus extending essentially from the bottom to the ceiling of the elevator car.

In particular embodiments the first movable wall panel may extend down to at least 50% of the height of the elevator car. Particularly, the first wall panel may even extend down to at least 33% of the height of the elevator car. Particularly, the first wall panel may even extend down to at least 25% of the height of the elevator car. Particularly, the first wall panel may even extend down to at least 15% of the height of the elevator car. Particularly, the first wall panel may even extend down to at least 10% of the height of the elevator car. Particularly, the first wall panel may even extend down to the floor of the elevator car.

In particular embodiments the first movable wall panel may extend up to at least 50% of the height of the elevator car. Particularly, the first wall panel may even extend up to at least 66% of the height of the elevator car. Particularly, the first wall panel may even extend up to at least 75% of the height of the elevator car. Particularly, the first wall panel may even extend up to at least 90% of the height of the elevator car. Particularly, the first wall panel may even extend up to the ceiling of the elevator car.

In an embodiment the first movable wall panel may extend from at least 25% of the height of the elevator car, particularly even from at least 33%, 50%, 66% or 75% of the height of the elevator car, to the ceiling of the elevator car. In an alternative embodiment the first movable wall panel may extend from the floor to at least 50% of the height of the elevator car, particularly even to at least 66%, 75% or 100% of the height of the elevator car. In yet another embodiment the first movable wall panel may extend from at least 25% or 33% of the height of the elevator car up to at least 66% or 75% of the height of the elevator car. Such first movable wall panels provide sufficient and convenient access to elements of the elevator system located outside the elevator car.

In an embodiment the elevator car further comprises at least one second movable wall panel which is arranged above and/or below the first movable wall panel. The at least one second movable wall panel is movable between a closed position, in which the at least one second movable wall panel constitutes a portion of a sidewall of the elevator car, and at least one open position providing an opening which allows access to areas outside the elevator from inside the elevator car.

Providing a second movable wall panel provides more flexibility in accessing components outside the elevator car. Providing (at least) two (smaller) movable wall panels instead of one large movable wall panel may facilitate the production and assembly of the elevator car. In particular, a first movable wall panel constituting or supporting the car operation panel and thus comprising a plurality of electric/electronic components may be produced and assembled independently of the second movable wall panel, which does not comprise any electric/electronic components.

In an embodiment the first and second movable wall panels may be connected to each other so that they are movable (only) together as an integral unit. This facilitates the movement of the first and second movable wall panels, as both movable wall panels may be moved in a single operation. The first and second movable wall panels in particular may be screwed or welded together. Alternatively, an adhesive may be employed for connecting the first and second movable wall panels.

In an embodiment the areas outside the elevator car, which are accessible via the opening provided by the first and second movable wall panels, may include an area at which at least one tension member connected with the elevator car, e.g. a fixation or a pulley/deflector roller, and/or an area at which at least one of a safety, a governor, a speed sensor and a position sensor is installed. The connection of the tension member(s) with the elevator car, the safeties, the governor, the speed sensor and the position sensor are components of the elevator system which need to be checked, maintained and/or repaired from time to time. Thus, it is very beneficial when these components are easily accessible from inside the elevator car.

In an embodiment the first and second movable wall panels may be pivotable around an axis, in particular around a vertically extending axis. The axis may be provided by an axle which is attached to the frame of the elevator car and/or to a structural wall panel adjacent to the opening. Pivoting the first and second movable wall panels provides a convenient way of moving the first and second movable wall panels between the open and closed positions. In particular, only a small force is needed for said movement.

In an embodiment the first and second movable wall panels may be slidable in a direction which is parallel or orthogonal to a side wall of the elevator car. In an alternative embodiment the first and second movable wall panels may be slidable in a direction which is inclined with respect to a side wall of the elevator car. In such a configuration, only as small space needs to be provided inside the elevator car for opening the first and second movable wall panels. Such an embodiment therefore is particularly beneficial in case of large first and second movable wall panels as such large wall panels would need much space when pivoted into the interior of the elevator car.

In an embodiment at least one guide rail, which may be configured for guiding the first and second movable wall panels, may be provided inside the elevator car, in particular at/in the floor and/or at/in the ceiling of the elevator car, in order to allow for a secure and defined movement of the first and second movable wall panels between the open and closed positions. The guide rail may be configured for guiding the rollers and/or for guiding pins provided at top or at the bottom of the first and second movable wall panels.

In an embodiment at least one scissor mechanism, which is configured for guiding the first and second movable wall panels, may be provided inside the elevator car in order to allow for a secure and defined movement of the first and second movable wall panels between the open and closed positions.

In an embodiment the lower of the first and second movable wall panels may comprise at least one roller for supporting the lower of the first and second movable wall panels on a floor of the elevator car. A roller supporting the lower of the first and second movable wall panels takes some weight from an axle or scissor mechanism, respectively. This facilitates the movement of the first and second movable wall panels and increases the lifetime of the opening mechanism.

In an embodiment the elevator car may further comprise a locking mechanism which allows to lock the first and second movable wall panels in their closed positions for preventing an unauthorized opening of the first and second movable wall panels providing access to the hoistway and/or components outside the elevator car.

The lock may be a mechanical lock which is configured to be opened by means of a mechanical key, e.g. a triangular key. Alternatively or additionally, the lock may be an electromagnetic lock, which is configured to be opened by means of a keycard, e.g. a keycard comprising an RFID-chip, and/or by entering a secret code via the car operation panel.

In an embodiment the elevator car may further comprise at least one safety switch which is configured for preventing any movement of the elevator car when at least one of the first and second movable wall panels is not positioned in its closed position. This enhances the safety of the elevator system and in particular the safety of a mechanic working inside the elevator car.

It may be possible to bypass the safety switch(es) in exceptional situations in which it is necessary to move the elevator car when at least one of the first and second movable wall panels is not positioned in its closed position, e.g. for inspecting a component outside the elevator car while the elevator car is moving. Bypassing the safety switch(es) may need an extra key, which is given only to very qualified mechanics. Bypassing the safety switch may issue a special optical and/or acoustical warning signal in order to notify the mechanic about the potentially dangerous situation.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the claims.

REFERENCES 2 elevator system
3 tension member
4 hoistway
5 drive
6 elevator car
7a landing control panel
7b car operation panel
8 landing
9a roof of the elevator car
9b floor of the elevator car
9c sidewall of the elevator car
10 landing door
11 elevator car door
12 position detection element
13 elevator control unit
14 structural wall panel
15 scissor mechanism
15a, 15b scissor bars
16 first movable wall panel
17 vertically extending axis
19 structural bar
18 second movable wall panel
20 area at which a tension member is fixed to the elevator car
22 area at which a safety, a governor, a speed sensor or a position sensor is installed 24 opening
26 roller
28 locking mechanism
30 safety switch
32 guide rail

What is claimed is:

1. An elevator car (6) comprising:
   at least one movable wall panel (16, 18), which is movable between a closed position, in which the at least one movable wall panel (16, 18) constitutes a portion of a sidewall of the elevator car (6), and at least one open position providing an opening (24) which allows access to areas outside the elevator from inside the elevator car (6),
   wherein the at least one movable wall panel (16, 18) includes a first movable wall panel (16) constituting or supporting a car operation panel (7b), at least one scissor mechanism (15), which is configured for guiding at least one of the at least one movable wall panels (16, 18), and wherein at least one of the at least one movable wall panels (16, 18) comprises at least one roller (26) for supporting at least one of the at least one movable wall panels (16, 18) on a floor of the elevator car (6).

2. The elevator car (6) according to claim 1, comprising a ceiling (12), wherein there is no opening or flap in the ceiling (12) of the elevator car (6).

3. The elevator car (6) according to claim 1, wherein the first movable wall panel (16) extends along at least 25% of the height of the elevator car (6); particularly along at least 33% of the height of the elevator car (6); particularly along at least 50% of the height of the elevator car (6); particularly along at least 66% of the height of the elevator car (6); particularly along at least 75% of the height of the elevator car (6); particularly along at least 90% of the height of the elevator car (6); particularly along the height of the elevator car (6).

4. The elevator car (6) according to claim 1, wherein the first movable wall panel (16) extends down to at least 50% of the height of the elevator car (6); particularly down to at least 33% of the height of the elevator car (6); particularly down to at least 25% of the height of the elevator car (6); particularly down to at least 15% of the height of the elevator car (6); particularly down to at least 10% of the height of the elevator car (6); particularly down to the floor of the elevator car (6).

5. The elevator car (6) according to claim 1, wherein the first movable wall panel (16) extends up to at least 50% of the height of the elevator car (6); particularly up to at least 66% of the height of the elevator car (6); particularly up to at least 75% of the height of the elevator car (6); particularly up to at least 90% of the height of the elevator car (6); particularly up to the ceiling (12) of the elevator car (6).

6. The elevator car (6) according to claim 1,
   wherein the elevator car (6) further comprises a second movable wall panel (18), which is arranged above or below the first movable wall panel (16) and which is movable between a closed position, in which the second movable wall panel (18) constitutes a portion of the sidewall of the elevator car (6), and at least one open position providing an opening (24) which allows access to areas outside the elevator car (6) from inside the elevator car (6).

7. The elevator car (6) according to claim 6, wherein the first and second movable wall panels (16, 18) are connected to each other so that they are movable as an integral unit.

8. The elevator car (6) according to claim 1, wherein the opening (24) provided by the at least one movable wall panel (16, 18) allows access to areas (20, 22) outside the elevator car (6) which need to checked, maintained and/or repaired, wherein the areas (20, 22) outside the elevator car (6) in particular include an area (20) at which at least one tension member (3) is connected to the elevator car (6) and/or an area (22) at which at least one of a safety, a governor, a speed sensor and a position sensor is installed.

9. The elevator car (6) according to claim 1, further comprising a locking mechanism (28) which allows locking the at least one movable wall panel (16, 18) in its closed position and/or at least one safety switch (30) which is configured for preventing any movement of the elevator car (6) when the at least one movable wall panel (16, 18) is not positioned in its closed position.

10. An elevator system (2) comprising an elevator car (6) according to claim 1.

11. A method of checking, maintaining or repairing an elevator system (2) according to claim 10, wherein the method includes:
    moving the at least one movable wall panel (16, 18) from a closed position into an open position for allowing access to components located outside the elevator car (6) from inside the elevator car (6).

* * * * *